United States Patent
Sun

(10) Patent No.: US 7,062,394 B2
(45) Date of Patent: Jun. 13, 2006

(54) PERFORMANCE CHARACTERIZATION USING EFFECTIVE PROCESSOR FREQUENCY

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 10/251,232

(22) Filed: Sep. 20, 2002

(65) Prior Publication Data

US 2004/0059545 A1   Mar. 25, 2004

(51) Int. Cl.
  *G01R 23/00*  (2006.01)
(52) U.S. Cl. .................. 702/75; 713/322; 713/501
(58) Field of Classification Search .............. 702/75, 702/81–83, 90, 96, 99, 106, 110, 118–121, 702/186; 713/320, 322, 501
  See application file for complete search history.

(56) References Cited

U.S. PATENT DOCUMENTS

| | | | | |
|---|---|---|---|---|
| 5,099,420 A * | 3/1992 | Barlow et al. | ............... | 710/119 |
| 6,349,387 B1 * | 2/2002 | Blomgren et al. | ........... | 713/501 |
| 6,470,456 B1 * | 10/2002 | Chung-Chih | ................ | 713/322 |
| 6,535,798 B1 * | 3/2003 | Bhatia et al. | ................ | 700/293 |
| 6,564,328 B1 * | 5/2003 | Grochowski et al. | ........ | 713/320 |
| 2002/0083354 A1 * | 6/2002 | Adachi | ........................ | 713/322 |
| 2002/0087904 A1 * | 7/2002 | Cai | ............................. | 713/322 |
| 2002/0143488 A1 * | 10/2002 | Cooper et al. | .............. | 702/132 |

OTHER PUBLICATIONS

The authoritative dictionary of IEEE standards terms, Dec. 2000, IEEE Press, seventh edition, p. 1001.*
Carl Staelin and Larry McVoy, *mhz: Anatomy of a Micro-Benchmarch* .
Larry McVoy and Carl Staelin, *Lmbench: Portable Tools for Performance Analysis* , Proceedings of the USENIX 1996 Annual Technical Conference, San Diego, California, Jan. 1996.

* cited by examiner

*Primary Examiner*—Hal Wachsman
*Assistant Examiner*—Mohamed Charioui
(74) *Attorney, Agent, or Firm*—Blakely, Sokoloff, Taylor & Zafman LLP

(57) ABSTRACT

An embodiment of the present invention includes a method to analyze processor performance. A processor is saturated with a workload. The processor has a specified operating frequency and a thermal throttling range from a minimum throttling state to a maximum throttling state. Events are sampled for a pre-determined time interval at a sampling rate during the workload. An effective processor frequency is calculated using the sampled events, the pre-determined time interval, and the sampling rate.

30 Claims, 5 Drawing Sheets

PERFORMANCE CHARACTERIZATION USING EFFECTIVE PROCESSOR FREQUENCY

BACKGROUND

1. Field of the Invention

Embodiments of the invention relates to the field of microprocessors, and more specifically, to performance characterization.

2. Description of Related Art

One of the features of current advanced micro-architectures is the thermal throttling capability that allows a processor to degrade performance gracefully when the thermal conditions exceed its design specifications. With the thermal throttling capability, a processor may operate at various performance states, corresponding to different effective frequencies, according to power or thermal conditions. However, this new feature presents new challenges to performance engineers when analyzing systems with processors operating at extreme conditions or defective processors. Most performance methodologies and tools may report confusing or misleading results when the basic processor operating frequencies can be dynamically changed. Although there may be status registers in the processor that report the throttling conditions of the processor, there is a lack of quantitative measurement that can characterize the extent of thermal throttling and its impact on system and application performance.

Most existing techniques or tools typically estimate the time to execute a number of instructions to determine the processor operating frequency. These techniques have a number of drawbacks. First, as processors become faster and faster, it is more and more difficult to estimate the execution time of a few instructions. Long measurement periods may introduce additional tasks, such as operating system (OS) background jobs, which contribute to the elapsed time, resulting in inaccuracy. Second, it is difficult to estimate execution time for advanced processor architectures such as superscalar pipelining, instruction reorder buffering, and instruction level parallelism. Third, most techniques require an idle system to execute instructions in an undisturbed condition. Processors with thermal throttling capability may exhibit different frequency characteristics, depending on the work load being run at the time. Therefore, measurements obtained during a thermal condition may result in inaccuracies.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention includes a method to analyze processor performance. A processor is saturated with a workload. The processor has a thermal throttling range from a minimum throttling state to a maximum throttling state. Events are sampled for a pre-determined time interval at a sampling rate during the workload. An effective processor frequency is calculated using the sampled events, the pre-determined time interval, and the sampling rate.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
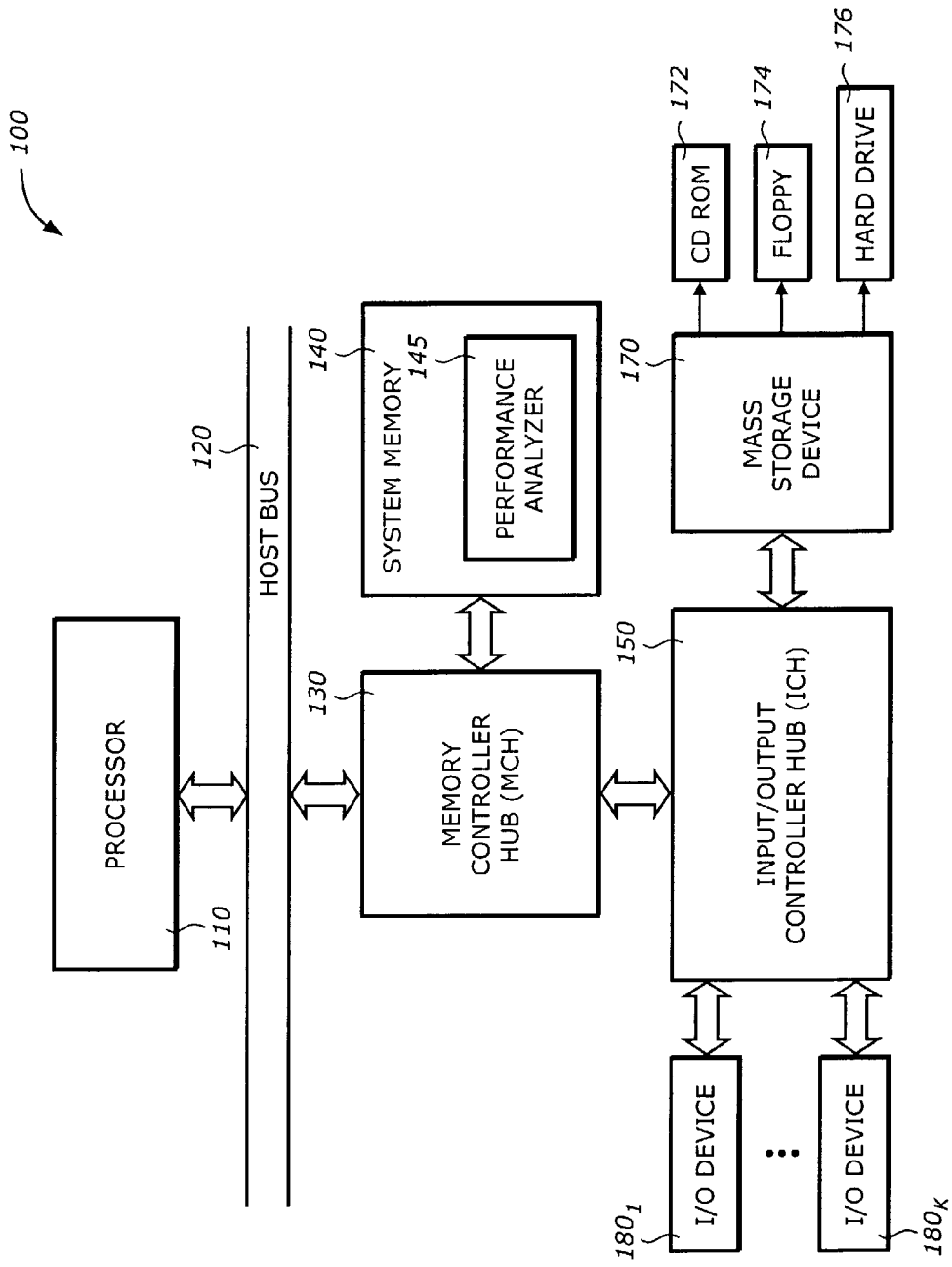
FIG. 1 is a diagram illustrating a system in which one embodiment of the invention can be practiced.

FIG. 1 is a diagram illustrating a system 100 in which one embodiment of the invention can be practiced. The system 100 includes a processor 110, a processor bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor 110 typically has a thermal throttling range from a minimum throttling state to a maximum throttling state.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a performance analyzer 145. Any one of the elements of the performance analyzer 145 may be implemented by hardware, software, firmware, microcode, or any combination thereof. The system memory 140 may also include other programs or data which are not shown, such as an operating system. In a thermal management environment, the system memory 140 may include thermal management operating system, software, or drivers to adjust the performance states of the processor 110 according to the thermal conditions. The performance analyzer 145 contains program code that, when executed by the processor 110, causes that processor 110 to perform the tasks as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy drive 174, and hard drive 176, and any other magnetic or optic storage devices such as digital video/versatile disc. The mass storage device 170 provides a mechanism to read machine-accessible media. The machine-accessible media may contain computer readable program code to perform tasks as described in the following.

The I/O devices $180_I$ to $180_K$ may include any I/O devices to perform I/O functions. Examples of I/O devices $180_I$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g, flash memory, read only memory, erasable read only memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
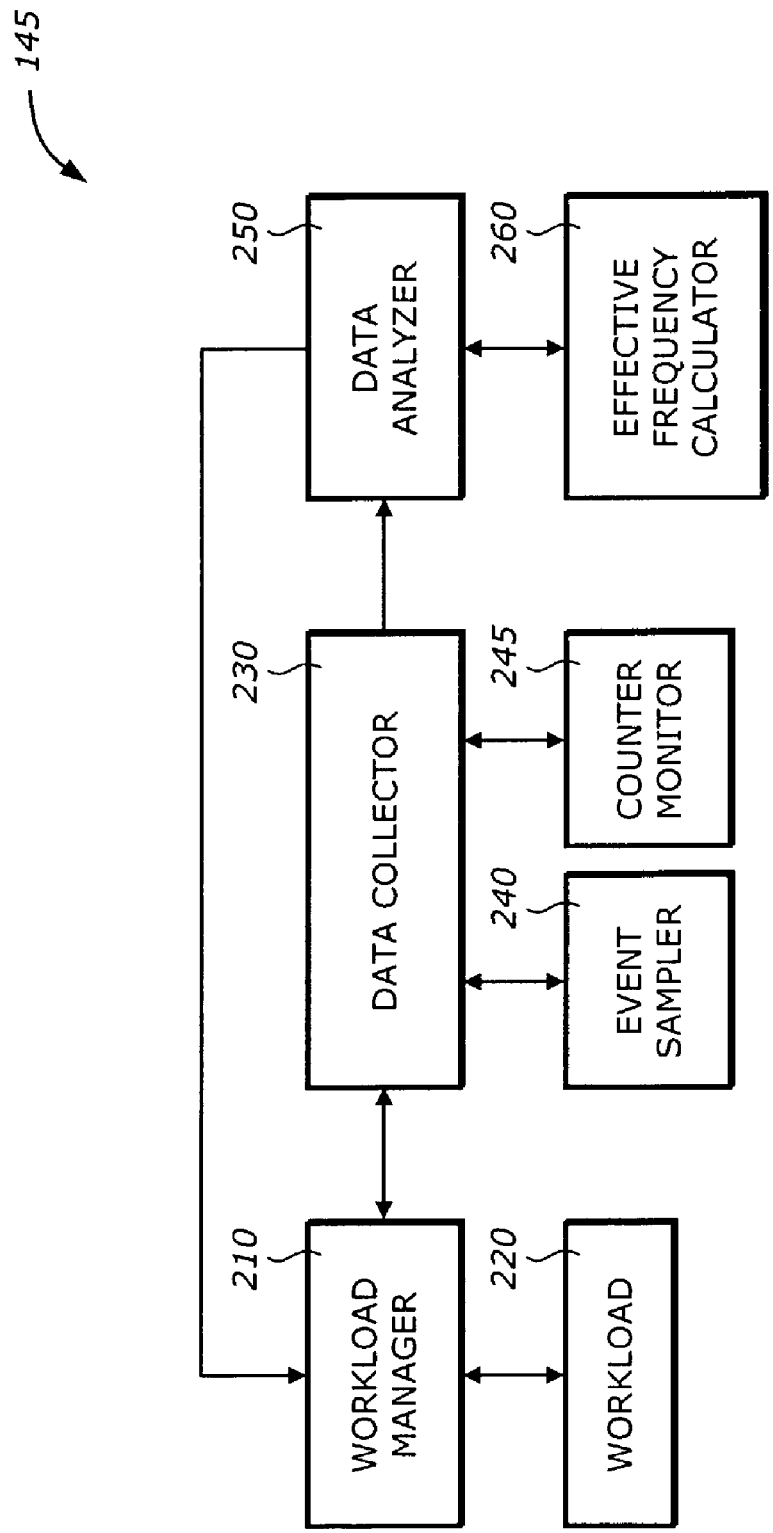
FIG. 2 is a diagram illustrating a performance analyzer according to one embodiment of the invention.

FIG. 2 is a diagram illustrating a performance analyzer 145 according to one embodiment of the invention. The performance analyzer 145 includes a workload manager 210, a data collector 230, and a data analyzer 250. The performance analyzer 145 may include other elements such as graphic user interface, program optimizer, etc.

The workload manager 210 manages the operation of the processor under measurement by interacting with a workload 220. The workload 220 provides benchmark programs or test code. The benchmark programs include programs or workloads that are designed to test the processor. Typically, the benchmark programs have a range of codes from light to heavy loads with a variety of program emphases. A program emphasis may be one of scientific computations, graphic manipulations, database transactions, disk I/O, peripheral device interactions, etc. The objective of the workload is to expose the processor to a wide range of operational conditions.

The data collector 230 collects data that are useful for the performance characterization. These data may include timing values, instruction addresses, memory usage, memory references, instruction op-codes, etc. The data collector 230 includes an event sampler 240 and a counter monitor 245. The event sampler 240 samples an event to take a snap shot of the event at a specified instant. Usually, the event sampler 240 continuously samples the specified event or events periodically at a sample rate during a pre-determined time interval. The sampling may be a time-based or event-based sampling. In a time-based sampling, the event sampler 240 collects samples of active instruction addresses at regular time-based interval. In an event-based sampling, the event sampler 240 collects samples of active instruction addresses after a specified number of processor events. The events may include any event that the user is interested in analyzing. Examples of interesting events include the number of clock ticks, the number of clocks per instruction, the number of retired instructions, etc. In one embodiment, the sampled event is the clock tick event. The counter monitor 245 keeps track of the processor activities and/or parameters in a number of performance counters. These activities may then be analyzed to provide processor statistics. Examples of the parameters may include the processor queue length, the number of context switches, the size of the available memory, the usage of the privileged instructions, and the usage of the processor.

The data analyzer 250 analyzes the data collected by the data collector 230. For example, it may identify the hotspot based on the statistics, determine the problem area, determine the thermal throttling state of the processor, etc. The data analyzer 250 may interact with the workload manager 210 to exchange parameters for workload selection. The data analyzer 250 interacts with an effective frequency calculator 260. The effective frequency calculator 260 calculates the effective frequency of the processor under the current workload condition.

Figure 3:
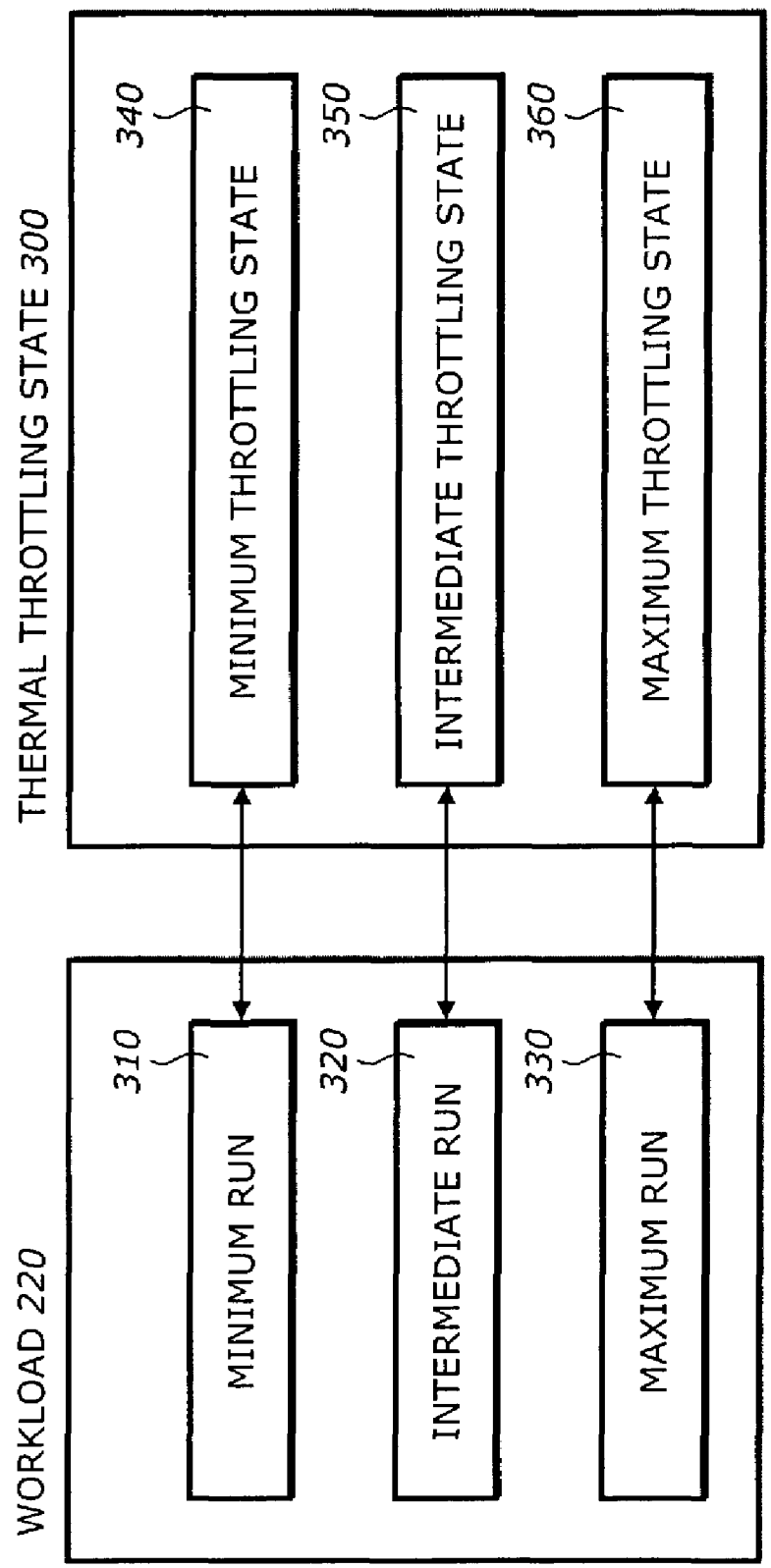
FIG. 3 is a diagram illustrating a workload according to one embodiment of the invention.

FIG. 3 is a diagram illustrating the workload 220 according to one embodiment of the invention. The workload 220 has corresponding processor states in the thermal throttling state 300.

The workload 220 typically includes a benchmark program run for a range for loads. The workload 220 includes a minimum run 310, one or more intermediate run 320, and a maximum run 330. The minimum run 310, the intermediate run 320, and the maximum run 330 have the lightest, medium, and heaviest loads in the benchmark program. The load here refers to the utilization of computational resources. It may include the problem size such as number of iterations in a simulation program, image size in an image processing program, number of warehouses in a business transaction program, etc. As the load increases, the computational demand increases and the processor has to perform more computations, resulting in thermal expansion.

When the workload increases from the minimum run 310 to the maximum run 330, the processor state may change as the thermal condition changes. The minimum run 310, the intermediate run 320, and the maximum run 330 correspond to minimum, intermediate, and maximum throttling states 340, 350, and 360, respectively. The minimum throttling state 340 is typically the state where the processor is under the least or approximately the least thermal stress. Under this condition, the processor typically is able to operate at approximately or substantially close to the specified frequency. The maximum throttling state 360 typically corresponds to the theoretical maximum thermal state that the processor may operate. Note that due to thermal expansion, the correspondence between the elements of the workload 220 and the throttling states in the thermal throttling state 300 may not be constant or static. In practice, this correspondence is dynamic according to the running condition of the processor or the environmental conditions of the system. For example, running the processor at the minimum run 310 may correspond to the minimum throttling state 340 at the beginning. When this minimum load is run over an extended period, the throttling state may escalate to the intermediate throttling state 350, etc.

The effective processor frequency F as calculated by the effective frequency calculator 260 in FIG. 2 represents the processor performance. It is a stable and reliable performance indicator that characterizes the different thermal throttling states shown in FIG. 3. Two boundary conditions exist for a good performance indicator: the upper bound and the lower bound. The upper bound is the upper limit of the operating frequency, which is typically the specified nominal operating frequency. This is the frequency at which the processor is not throttling. The lower bound is the lower limit of the operating frequency. This is the frequency at which the processor is at its theoretical maximum throttling state.

The effective processor frequency F is determined as follows:

$$F = N/(T*S) \qquad (1)$$

where N is the total count of the clockticks events, T is the elapsed time or the time interval over which the processor runs its workload, and S is the sampling rate.

The clockticks event is one of the events that the event-based sampling can be configured to operate. N therefore is the total number of clock ticks within T. T is the time interval as specified by the user, in seconds. S is the sampling rate, selected by the user to specify how often the sampling takes place. The effective processor frequency F is therefore calculated by dividing the total count of the clockticks events by a product formed by the time interval and the sampling rate.

When the processor runs a workload, it is typically saturated to run at its full limit as provided by the thermal management operating system. Saturating the processor therefore allows the processor to run the workload at its given condition.

Figure 4:
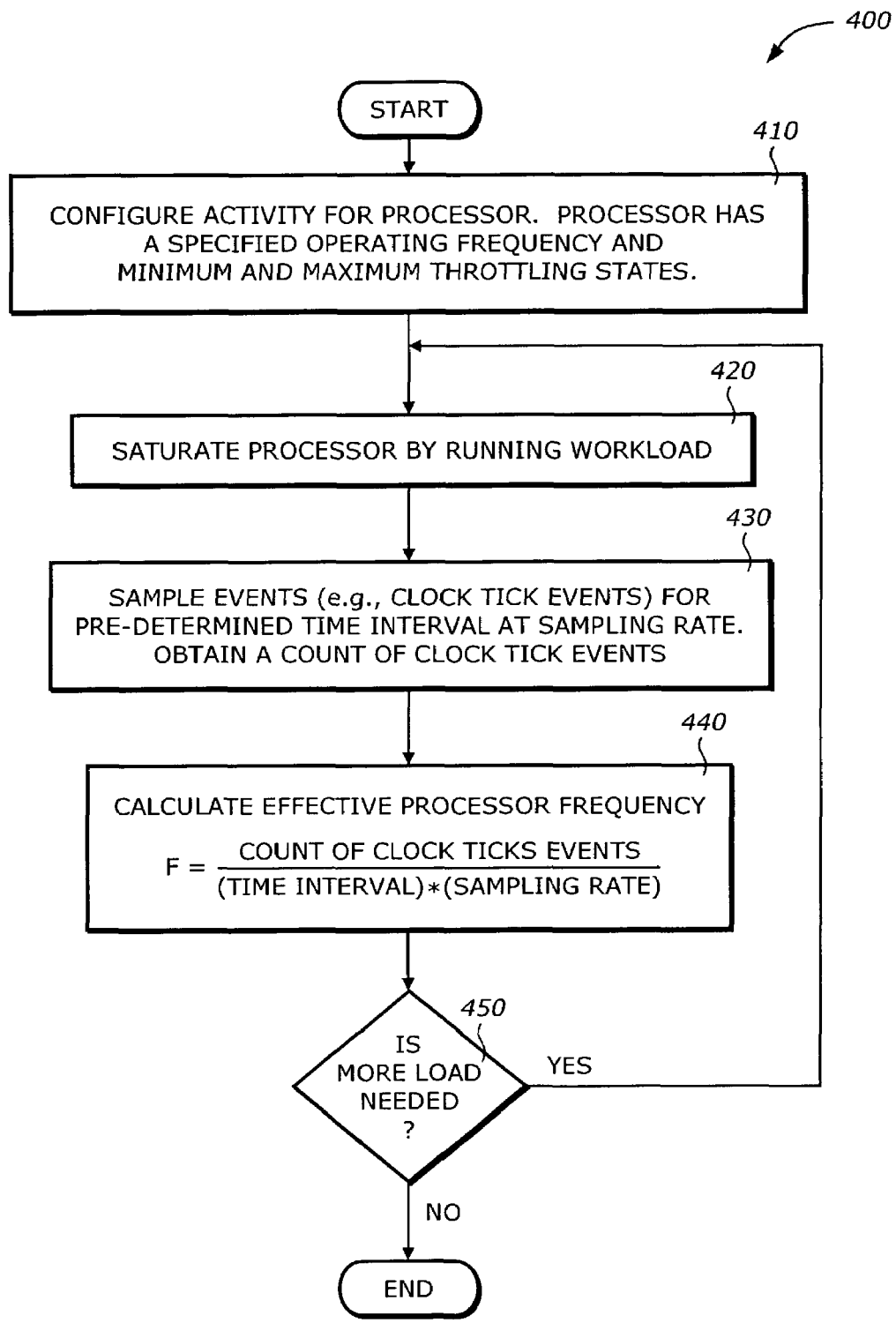
FIG. 4 is a flowchart illustrating a process to calculate effective processor frequency according to one embodiment of the invention.

FIG. 4 is a flowchart illustrating a process 400 to calculate effective processor frequency according to one embodiment of the invention.

Upon START, the process 400 configures the activity for the processor (Block 410). The processor has a specified operating frequency and minimum and maximum throttling states. This includes setting up the environment, load the workload executable code, initializes parameters, counters, buffers, initializes thermal drivers, etc. Next, the process saturates the processor by running a workload (Block 420). The thermal management may adjust the processor performance state according to the load imposed by the workload.

Then, the process 400 samples the processor events for a pre-determined time interval at a selected sample rate (Block 430). This includes obtaining a count for the events. In one embodiment, the event is the clock tick event. Next, the process 400 calculates the effective processor frequency $F = N/(T*S)$ as shown in equation (1) (Block 440). The effective clock frequency F accurately characterizes the processor performance at the specified condition.

Then, the process 400 determines if more workload is needed (Block 450). If so, the process 400 selects the next workload with a different loading factor (Block 460) and returns to Block 420. Otherwise, the process 400 is terminated.

Figure 5:
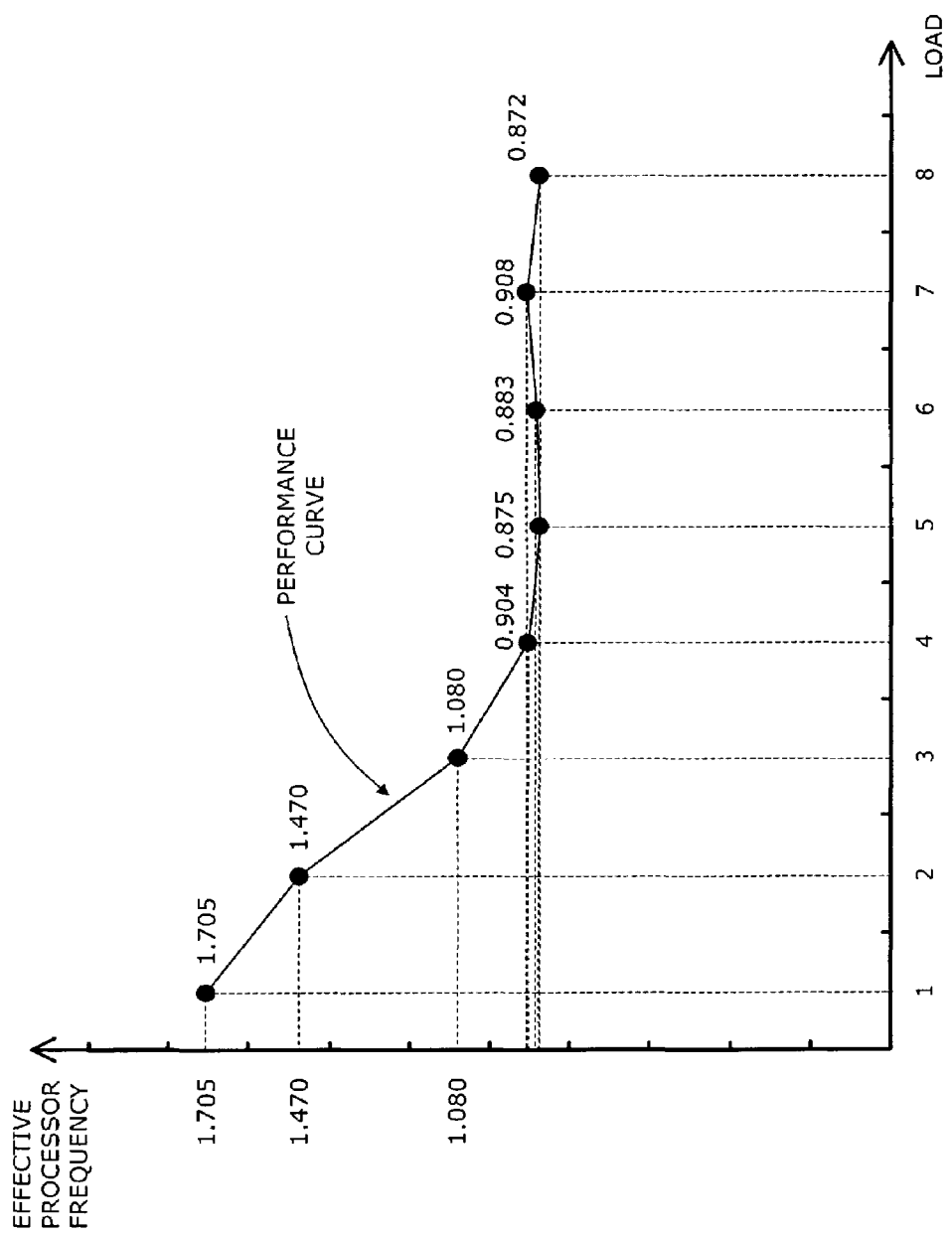
FIG. 5 is a diagram illustrating a performance curve according to one embodiment of the invention.

FIG. 5 is a diagram illustrating a performance curve 500 according to one embodiment of the invention. The performance curve 500 shows a typical performance characteristic of a processor running a range of loads. The vertical axis is the effective processor frequency F and the horizontal axis is the load.

The performance curve 500 is the result of a real world example to demonstrate the effectiveness and reliability of the effective processor frequency. A processor rated at 1.7 GHz is used to run a benchmark program. The benchmark is a Java-based workload that simulates a three-tiered business transactional environment. The workload is run from a simple single warehouse, ramping up to a heavily loaded multi-threaded environment to stress out the system under test. Table 1 shows the result of the program.

TABLE 1

| No. of Warehouses | Benchmark throughput | Clockticks (in Billions) | Time (sec) | Effective Processor Frequency (GHz) |
|---|---|---|---|---|
| 1 | 7145 | 185.897 | 109 | 1.705 |
| 2 | 5985 | 152.937 | 104 | 1.470 |
| 3 | 3610 | 130.43 | 120 | 1.080 |
| 4 | 2988 | 103.125 | 114 | 0.904 |
| 5 | 2875 | 90.186 | 103 | 0.875 |
| 6 | 2863 | 94.506 | 107 | 0.883 |
| 7 | 2828 | 97.238 | 107 | 0.908 |
| 8 | 2841 | 83.755 | 96 | 0.872 |

As shown in Table 1, the benchmark run experiences a dramatic drop in throughput, with warehouse 8 performing at only 40% of the warehouse 1 level. This demonstrates a completely different behavior from that of a normal, non-throttling system. The calculated effective processor frequency F detects this throttling behavior with about 50% drop in operating frequency.

The calculated effective processor frequency F satisfies the two boundary conditions above. It satisfies the upper bound because it is substantially close to the specified maximum operating frequency of 1.7 GHz at warehouse 1, when the system has no or little throttling. It satisfies the lower bound because it shows a near 50% drop at warehouse 8, corresponding to substantially close to a theoretical maximum throttling state of 50% for a Pentium 4 processor, where the processor operates at only 50% of all clock cycles at such a state. Other warehouse levels show that F stabilizes at around the warehouse 8 value.

As shown, the technique does not require the processor to be in an idle state for performance characterization. The key concept is to saturate the processor with a workload and measure the processor clock ticks directly. The technique does not depend on internal processor technologies such as parallel execution.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   saturating a processor with a workload, the processor having a specified operating frequency and a thermal throttling range from a minimun throttling state to a maximum throttling state;
   sampling events for a pre-determined time interval at a sampling rate during the workload; and
   calculating an effective processor frequency using the sampled events, the pre-determined time interval, and the sampling rate.

2. The method of claim 1 wherein saturating comprises:
   running the workload using the processor, the workload having a range of loads, the range includes a minimum load and a maximum load.

3. The method of claim 2 wherein running the workload comprises:
   running the workload at the minimum load to approximately correspond to the minimum throttling state.

4. The method of claim 3 wherein calculating the effective processor frequency comprises:
   calculating the effective processor frequency when the workload is run at the minimum load to correspond to the minimum throttling state, the calculated effective processor frequency being substantially close to the specified operating frequency.

5. The method of claim 2 wherein running to workload comprises:
   running the workload at the maximum load to approximately correspond to the maximum throttling state.

6. The method of claim 5 wherein calculating the effective processor frequency comprises:
   calculating the effective processor frequency when the workload is run at the maximum load to correspond to the maximum throttling state.

7. The method of claim 1 wherein sampling the events comprises:
   obtaining a count of clock tick events for the pre-determined time interval.

8. The method of claim 7 wherein calculating the effective processor frequency comprises:
   multiplying the pre-determined time interval wit the sampling rate to provide a product; and
   dividing the count by the product to provide the effective processor frequency.

9. The method of claim 1 wherein saturating the processor comprises:
   saturating the processor with a benchmark program.

10. The method of claim 1 wherein sampling the clock tick events comprises:
    selecting the sampling rate.

11. An article of manufacture comprising:
    a machine-accessible medium including data that, when accessed by a machine, causes the machine to perform operations comprising:
    saturating a processor with a workload, the processor having a specified operating frequency and a thermal throttling range from a minimum throttling state to a maximum throttling state;
    sampling events for a pro-determined time interval at a sampling rate during the workload; and
    calculating an effective processor frequency using the sampled events, the pre-determined time interval, and the sampling rate.

12. The article of manufacture of claim 11 wherein the data causing the machine to perform saturating the processor comprises data that causes the machine to perform operations comprising:
    running the workload using the processor, the workload having a range of loads, the range includes a minimum load and a maximum load.

13. The article of manufacture of claim 12 wherein the data causing the machine to perform running the workload comprises data that causes the machine to perform operations comprising:

running the workload at the maximum load to approximately correspond to the maximum throttling state.

14. The article of manufacture of claim 13 wherein the data causing the machine to perform calculating the effective processor frequency comprises data that causes the machine to perform operations comprising:
calculating the effective processor frequency when the workload is run at the maximum load to correspond to the maximum throttling state.

15. The article of manufacture of claim 14 wherein the data causing the machine to perform sampling the clock tick events comprises data that causes the machine to perform operations comprising:
selecting the sampling rate.

16. The article of manufacture of claim 12 wherein the data causing the machine to perform running the workload comprises data that causes the machine to perform operations comprising:
running the workload at the minimum load to approximately correspond to the minimum throttling state.

17. The article of manufacture of claim 16 wherein the data causing the machine to perform calculating the effective processor frequency comprises data that causes the machine to perform operations comprising:
calculating the effective processor frequency when the workload is run at the minimum load to correspond to the minimum throttling state, the calculated effective processor frequency being substantially close to the specified operating frequency.

18. The article of manufacture of claim 11 wherein The data causing the machine to perform sampling the events comprises data that causes the machine to perform operations comprising:
obtaining a count of clock tick events for the pre-determined time interval.

19. The article of manufacture of claim 18 wherein the data causing the machine to perform calculating the effective processor frequency comprises data that causes the machine to perform operations comprising:
multiplying the pre-determined time interval with the sampling rate to provide a product; and
dividing the count by the product to provide the effective processor frequency.

20. The article of manufacture of claim 11 wherein to data causing the machine to perform saturating the processor comprises data that causes the machine to perform operations comprising:
saturating the processor with a benchmark program.

21. A system comprising;
a processor having a specified operating frequency and a thermal throttling range from a minimum throttling state to a maximum throttling state;
a memory coupled to the processor to contain program code, the program code, when executed, causing the processor to:
saturate the processor with a workload,
sample events for a pro-determined time interval at a sampling rate during the workload, and
calculate an effective processor frequency using the sampled events, the pre-determined time interval, and the sampling rate.

22. The system of claim 21 wherein the program code causing the processor to saturate causes the processor to:
run the workload, the workload having a range of loads, the range includes a minimum load and a maximum load.

23. The system of claim 22 wherein the program code causing the processor to run the workload causes the processor to:
run the workload at the minimum load to approximately correspond to the minimum throttling state.

24. The system of claim 23 wherein the program code causing the processor to calculate the effective processor frequency causes the processor to:
calculate the effective processor frequency when the workload is run at the minimum load to correspond to the minimum throttling state, the calculated effective processor frequency being substantially close to the specified operating frequency.

25. The system of claim 22 wherein the program code causing the processor to run the workload causes the processor to:
run the workload at the maximum load to approximately correspond to the maximum throttling state.

26. The system of claim 25 wherein the program code causing the processor to calculate the effective processor frequency causes the processor to:
calculate the effective processor frequency when the workload is run at the maximum load to correspond to the maximum throttling state.

27. The system of claim 21 wherein the program code causing the processor to sample the events causes the processor to:
obtain a count of clock tick events for the pre-determined time interval.

28. The system of claim 27 wherein the program code causing the processor to calculate the effective processor frequency causes the processor to:
multiply the pro-determined time interval with the sampling rate to provide a product; and
divide the count by the product to provide the effective processor frequency.

29. The system of claim 21 wherein the program code causing the processor to saturate the processor causes the processor to:
saturate the processor with a benchmark program.

30. The system of claim 21 wherein the program code causing the processor to sample the clock tick events causes the processor to:
select the sampling rate.

* * * * *

UNITED STATES PATENT AND TRADEMARK OFFICE
CERTIFICATE OF CORRECTION

PATENT NO.        : 7,062,394 B2
APPLICATION NO.   : 10/251232
DATED             : June 13, 2006
INVENTOR(S)       : Sun It is certified that error appears in the above-identified patent and that said Letters Patent is hereby corrected as shown below:

In column 10, at line 1 claim 21, delete "pro-determined" and insert --pre-determined--.

Signed and Sealed this

Fourteenth Day of April, 2009

JOHN DOLL
*Acting Director of the United States Patent and Trademark Office*